US007081884B2

(12) United States Patent
Kong

(10) Patent No.: US 7,081,884 B2
(45) Date of Patent: Jul. 25, 2006

(54) COMPUTER INPUT DEVICE WITH ANGULAR DISPLACEMENT DETECTION CAPABILITIES

(75) Inventor: Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 340 days.

(21) Appl. No.: 10/423,696

(22) Filed: Apr. 25, 2003

(65) Prior Publication Data

US 2004/0212587 A1   Oct. 28, 2004

(51) Int. Cl.
    *G09G 5/08* (2006.01)
(52) U.S. Cl. ........................ 345/163; 345/158; 345/167
(58) Field of Classification Search ......... 345/156–167
    See application file for complete search history.

(56) References Cited

U.S. PATENT DOCUMENTS

| 5,440,326 | A | * | 8/1995 | Quinn | ........................ 345/156 |
| 5,512,920 | A | * | 4/1996 | Gibson | ........................ 345/163 |
| 5,912,661 | A | * | 6/1999 | Siddiqui | ...................... 345/166 |
| 6,097,371 | A | | 8/2000 | Siddiqui et al. | |
| 6,172,354 | B1 | | 1/2001 | Adan et al. | |
| 6,281,881 | B1 | | 8/2001 | Siddiqui et al. | |
| 6,618,038 | B1 | * | 9/2003 | Bohn | ......................... 345/164 |

OTHER PUBLICATIONS

Gyration, Inc. "Gyration, MicroGyro 1000" 6 pages, Saratoga, CA; copyright 2001.
Gyration, Inc., "Gyration Ultra Cordless Optical Mouse," 2 pages, Sarasota, CA; copyright 2002.

* cited by examiner

Primary Examiner—Richard Hjerpe
Assistant Examiner—Jean Lesperance
(74) Attorney, Agent, or Firm—Banner & Witcoff, LTD

(57) ABSTRACT

A computer input device, such as a mouse, is disclosed that includes one or more sensor systems for detecting translational displacement and angular displacement of the input device relative to a support surface. The input device transmits a signal to a computing device in response to detecting the translational displacement and angular displacement, and the computing device moves an image on a display screen in a linear manner in response to the signal. The sensor system within the input device may be an optical sensor system, for example.

29 Claims, 8 Drawing Sheets

COMPUTER INPUT DEVICE WITH ANGULAR DISPLACEMENT DETECTION CAPABILITIES

BACKGROUND OF THE INVENTION

1. Field of the Invention

The present invention relates to peripheral input devices for a computer. The invention concerns, more particularly, an input device that senses angular displacement of the input device relative to a support surface. The invention has application to moving a pointer image, such as a cursor, relative to a computer display or scrolling an image relative to the computer display, for example.

2. Description of Background Art

As the field of computer science has matured, a variety of peripheral input devices have been developed to facilitate the use of computer systems and the entry of information into computer systems. One particular type of input device is conventionally referred to as a pointing device. Examples of pointing devices include a mouse, touchpad, trackball, and stylus, for example. Among other functions, a pointing device is utilized to move a pointer image, such as a cursor, relative to a display screen. More particularly, movement of the pointing device or a component associated with the pointing device generates position data corresponding with the movement of the pointing device. The position data is then transmitted to the computer system and processed by the computer system so as to be rendered on the display screen as movement of the pointer image. By utilizing the pointing device, therefore, the user can move the pointer image to a desired location on the display screen. A command key on the pointing device can then be activated to manipulate data or other images rendered on the display screen.

Many traditional display screens permit only a single data file, such as a text document, digital photograph, spreadsheet, or Web page, to be conveniently displayed as an image on the display screen. When configuring a conventional pointing device for use with a traditional display screen, the user balances the velocity of the pointer image with the accuracy of movement of the pointer image. In general, the velocity of the pointer image is inversely-related to the accuracy of movement of the pointer image. Accordingly, an increase in the velocity of the pointer image engenders a corresponding decrease in the accuracy with which the pointer image may be placed at a desired location. For this reason, the user generally configures the pointing device to move the pointer image at the highest velocity that also permits the pointer image to be accurately placed in a desired location on the display screen.

In contrast with many traditional display screens, a modern display screen may exhibit significantly greater dimensions and resolution, which permits relatively large quantities of data to be rendered. When configuring a conventional pointing device for use with a modern display screen, the balance between the velocity of the pointer image and the accuracy of movement of the pointer image remains relevant. Accordingly, the user generally configures the pointing device to move the pointer image at the highest velocity that also permits the pointer image to be accurately placed in a desired location on the display screen. Although this balance between velocity and movement is suitable for working with a relatively small, traditional display screen, the user may find that the velocity is insufficient to efficiently permit the user to move the pointer image between areas that are separated by a relatively large distance on the relatively large, modern display screen. Accordingly, the velocity of the pointer image may not be sufficient to efficiently move the pointer image from one portion of the display screen to another portion of the display screen.

When using a mouse, for example, with the relatively large, modern display screen, the user may be required to perform multiple movements of the mouse to cause a desired movement in the pointer image. For example, translating the mouse across the width of a support surface may only move the pointer image a portion of the desired distance on the display screen. The user may then be required to repetitively lift the mouse from the support surface and reposition the mouse on the support surface to induce additional movement in the pointer image. Similarly, multiple movements of a trackball may be required to cause a desired movement in the pointer image.

SUMMARY OF THE INVENTION

The present invention is an input device for moving an image on a display screen. The input device includes a housing, a sensor system, and an actuator. The housing forms at least a portion of an exterior of the input device, and the sensor system is located at least partially within the housing. Furthermore, the sensor system is operable in a translational mode to detect translational displacement of the input device, and the sensor system is operable in an angular mode to detect angular displacement of the input device. The actuator is utilized to selectively convert operation of the sensor system from the translational mode to the angular mode.

The sensor system may have the configuration of an optical sensor system that detects translational displacement and angular displacement of the input device. A processor, also located at least partially within the housing, is operatively connected to the optical sensor system. The processor transmits a signal directing translational movement of an image in response to the translational displacement and the angular displacement of the input device.

The invention also involves a method of moving an image relative to a display screen. The method includes detecting translational displacement of an input device relative to a support surface of the input device. A first signal is then transmitted that directs a computing device to translate the image on the display screen in response to the translational displacement. The method also includes detecting angular displacement of the input device relative to the support surface of the input device. A second signal is then transmitted that directs the computing device to translate the image on the display screen in response to the angular displacement.

In a further aspect of the invention a method of moving an image relative to a display screen involves obtaining a first picture of a support surface with an optical sensor system. A second picture of the support surface is then obtained with the optical sensor system, and the second picture is compared with the first picture to detect angular displacement of the second picture with respect to the first picture. A signal is then transmitted to a computing device directing the image to translate in response to angular displacement of the second picture with respect to the first picture.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose an input device in accordance with the present invention. The input device includes a sensor system that detects translational displacement and angular displacement of the input device, and then transmits a signal that directs a computing device to move an image on a display screen in response to the translational displacement or the angular displacement. The invention has application to moving a pointer image, such as a cursor, relative to the display screen, and the invention has application to scrolling an image relative to the display screen.

Figure 1:
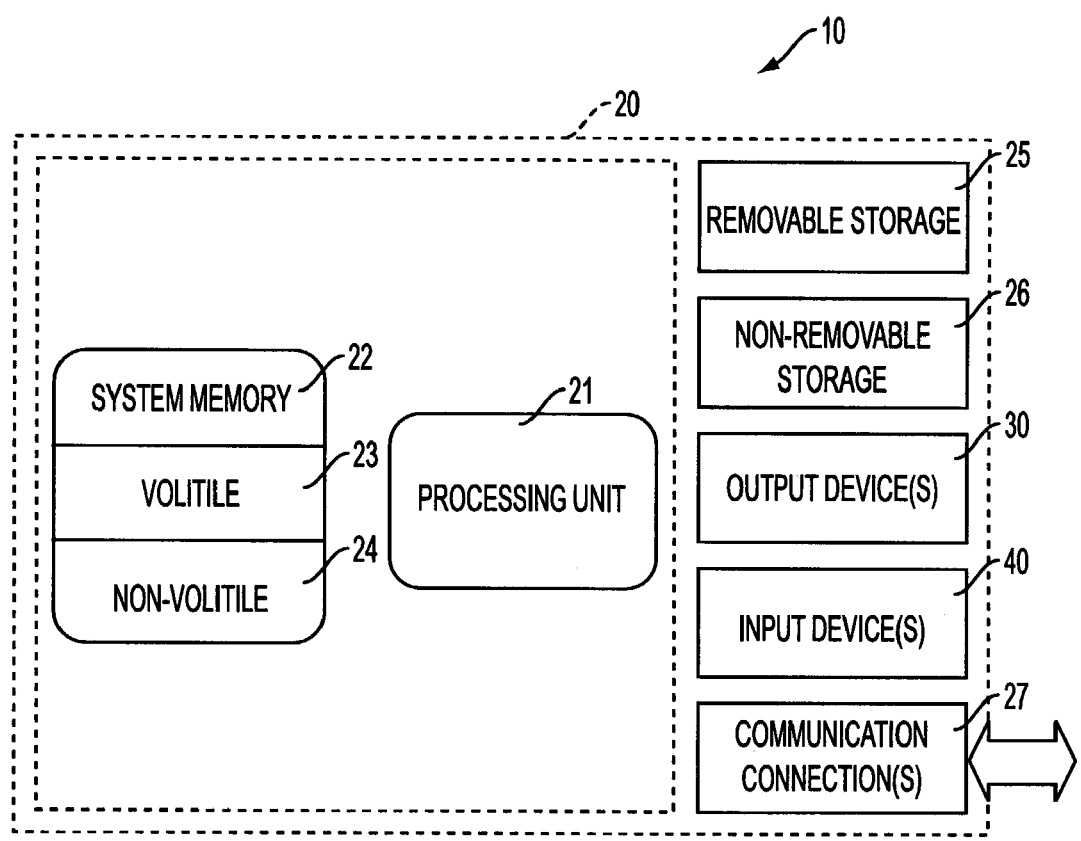
FIG. 1 is a schematic illustration of an exemplary operating environment for the present invention.

Aspects of the present invention may be implemented using software. Accordingly, an enhanced understanding of the invention may be gained by briefly discussing the components and operation of an exemplary operating environment on which various embodiments of the invention may be employed. FIG. 1 illustrates an example of an operating environment 10 having a computing device 20 that provides a suitable environment in which various aspects of the invention may be implemented. The operating environment 10 is only one example of a suitable operating environment, however, and is not intended to suggest any limitation as to the scope of use or functionality of the invention. Other well known computing systems, operating environments, or configurations that may be suitable for use with the invention include, but are not limited to, personal computers, server computers, hand-held or laptop devices, multiprocessor systems, microprocessor-based systems, programmable consumer electronics, networked personal computers, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The computing device 20 typically includes at least some form of computer readable media. Computer readable media can be any available media that can be accessed by the computing device 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the computing device 20.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

In its most basic configuration, the computing device 20 typically includes a processing unit 21 and system memory 22. Depending on the exact configuration and type of computing device 20, the system memory 22 may include volatile memory 23 (such as RAM), non-volatile memory 24 (such as ROM, flash memory, etc.), or some combination of the two memory types. Additionally, the computing device 20 may also have mass storage devices, such as a removable storage device 25, a non-removable storage device 26, or some combination of two storage device types. The mass storage devices can be any device that can retrieve stored information, such as magnetic or optical disks or tape, punched media, or holographic storage. As will be appreciated by those of ordinary skill in the art, the system memory 22 and mass storage devices 25 and 26 are examples of computer storage media.

The computing device 20 will typically have communication connections 27 to other devices, computers, networks, servers, etc. using either wired or wireless media. As will be appreciated by those of ordinary skill in the art, the communication connections 27 are merely examples of communication media. Other components of the computing device 20 may include one or more output devices 30 and input devices 40. The output devices 30 output data to a user and may have the form of a display, a speaker, printer or a tactile feedback device. The input devices 40 may include a keyboard, microphone, scanner, or pointing device for receiving input from a user. All of these devices and connections are well-known in the art and thus will not be discussed at length here.

Figure 2:
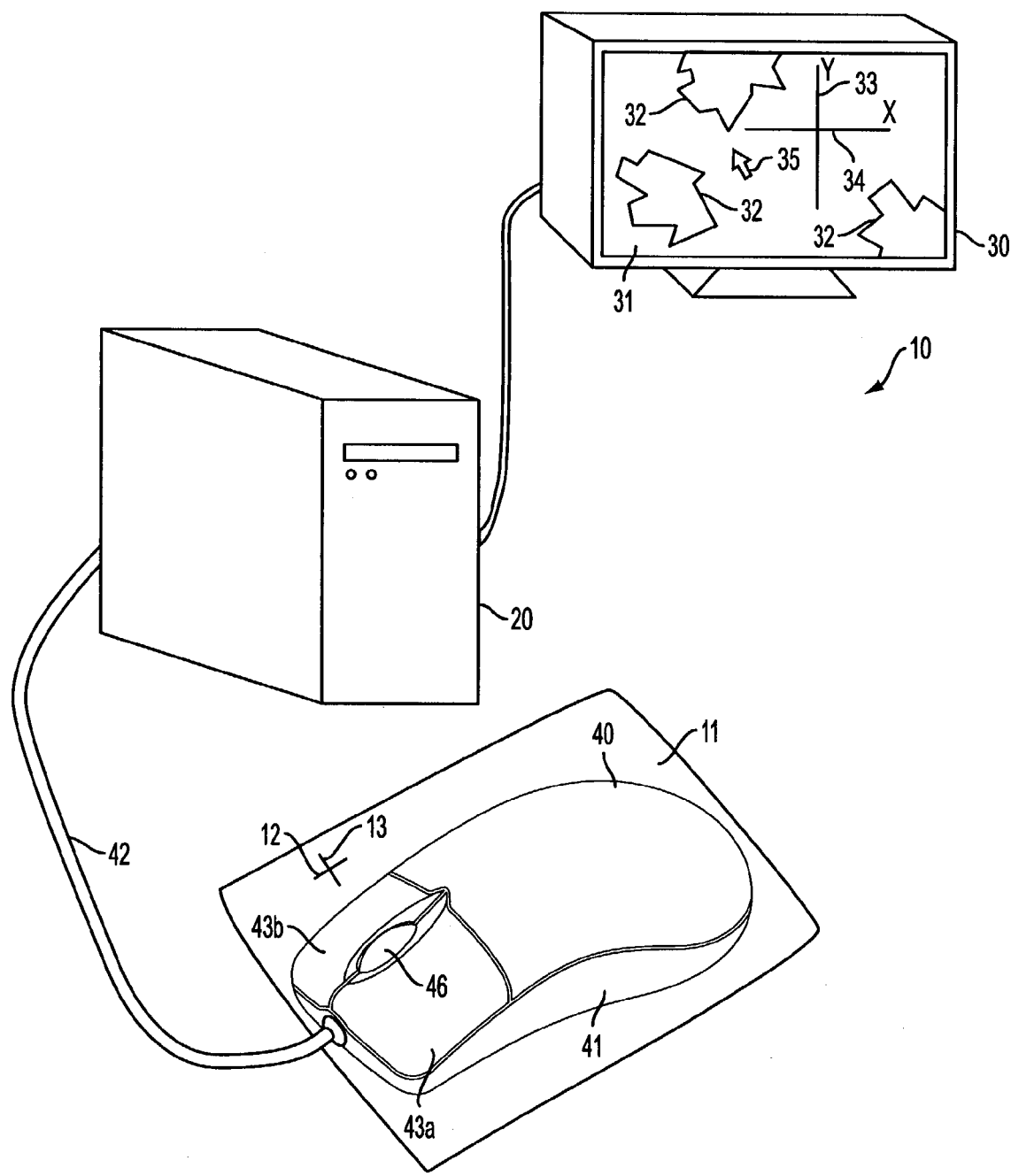
FIG. 2 is a perspective view of the exemplary operating environment, which has a computing device, an output device, and an input device.

With reference to FIG. 2, the operating environment 10 is depicted as having the configuration of a personal computer for purposes of example. The operating environment 10 includes, therefore, the computing device 20 that is operatively connected to the output device 30 and the input device 40. The output device 30 has the configuration of a computer monitor, and the input device 40 has the configuration of a pointing device. In the manner discussed above, one skilled in the relevant art will recognize that one or more data files may be processed by the computing device 20 and a signal may be transmitted to the output device 30, thereby directing the output device 30 to render an image 32 on a display screen 31. The input device 40 is utilized in connection with the computing device 20 to manipulate the image 32 or a portion of the image 32, as described in greater detail below.

The output device 30 is depicted as a computer monitor having the display screen 31 and the image 32, which is rendered on the display screen 31. The image 32 may represent a single data file, such as a text document, digital photograph, spreadsheet, or Web page. Alternately, the image 32 may include multiple data files that are processed by the computing device 20 and rendered on the display screen 31. For purposes of reference, a vertical y-axis 33 and a horizontal x-axis 34 are depicted on the display screen 31. Furthermore, a pointer image 35 is superimposed over the image 32 and may move relative to the display screen 31 and the image 32. That is, the pointer image 35 may move along the y-axis 33, the x-axis 34, or any diagonal direction therebetween. As is well-known in the art, the movement of the pointer image 35 is directed by the input device 40, which is controlled by the user. The term pointer image is hereby defined as any image configured to be controlled by the movement of the input device 40, and may include a graphical image of a cursor, the various graphical images utilized in gaming applications, or any other graphical images generally associated with software applications, as is known in the art.

Figure 3:
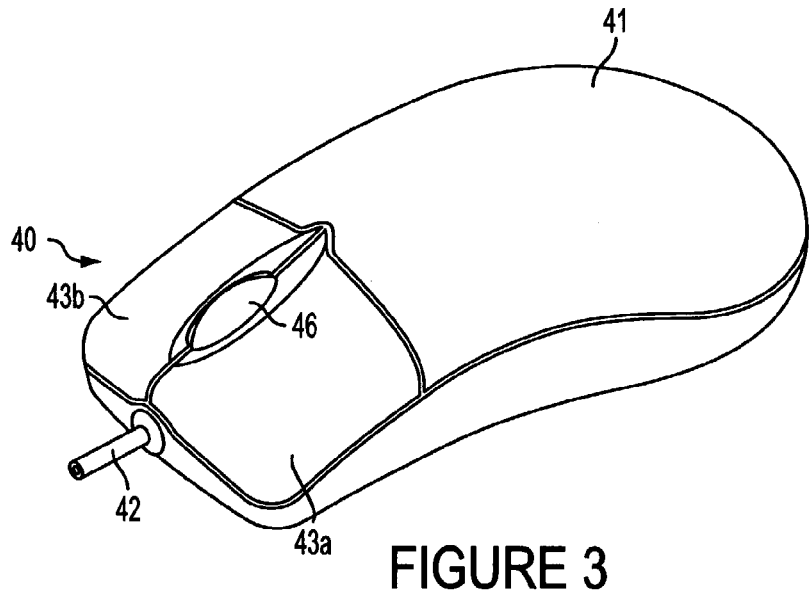
FIG. 3 is a perspective view of the input device.
Figure 4:
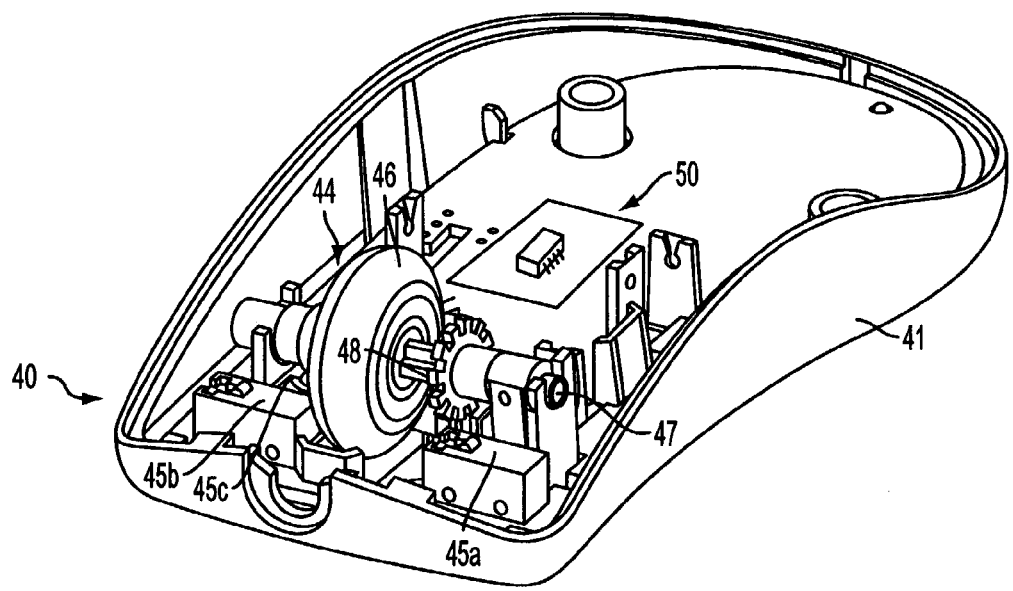
FIG. 4 is a cut-away perspective view of the input device.

The input device 40 is depicted individually in FIGS. 3 and 4 as a mouse-style pointing device. As is well-known in the art, one purpose of the input device 40 is to manipulate virtual objects, such as buttons, icons, hypertext links, or data associated with the image 32. A housing 41 forms an exterior of the input device 40 and has a configuration that interfaces with a hand of the user. A cord 42 extends from a front portion of the housing 41 and is utilized to transmit signals from the input device 40 to the computing device 20. Alternately, a conventional wireless connection between the input device 40 and the computing device 20 may also be utilized, as is well-known in the art. The signals that are transmitted by the cord 42 are typically generated in response to user manipulation of a primary key 43a, a secondary key 43b, or a scrolling apparatus 44. Furthermore, the signals may be generated by a tracking assembly 50 that senses translational displacement and angular displacement of the input device 40 relative to a support surface 11 upon which the input device 40 rests. Within the scope of the present invention, the support surface 11 may be any surface upon which the input device 40 rests, including a desktop, a table, a tray, the ground, a hand of the user, or other surface, for example.

The primary key 43a and the secondary key 43b each have a depressible structure and are associated with a pair of switches 45a and 45b, respectively, which are positioned within the housing 41. Accordingly, the primary key 43a may be depressed by the user to activate the switch 45a, thereby generating a signal that is transmitted to the computing device 20. Similarly, the secondary key 43b may be depressed by the user to activate the switch 45b. The scrolling apparatus 44 includes a scroll wheel 46, an axle 47, and an encoder 48. The scroll wheel 46 protrudes outward from the housing 41 and is positioned between the primary key 43a and the secondary key 43b. The scroll wheel 46 is rotatably-mounted on the axle 47, and the encoder 48 is positioned to detect the rotation of the scroll wheel 46. The scrolling apparatus 44 also includes a z-switch 45c that detects downward movement of the scroll wheel 46, as taught by U.S. Pat. No. 5,912,661 to Siddiqui, which is hereby incorporated by reference.

The schematically-illustrated tracking assembly 50 is enclosed within the housing 41 and detects translational displacement and angular displacement of the input device 40 relative to the support surface 11. As utilized herein, translational displacement is intended to indicate a translation of the input device 40 from one position on the support surface 11 to another, different position on the support surface 11. The definition of translational displacement does not necessarily imply that the input device 40 follows a straight path between the two positions. Rather, the definition of translational displacement merely suggests a translational movement, even if the translational movement includes a curved path or otherwise non-linear path. Also as utilized herein, angular displacement is intended to indicate a change in angular orientation of the input device 40 with the input device 40 resting upon the support surface 11. Accordingly, the tracking assembly 50 detects translational and rotational displacements of the input device 40.

The configuration of the tracking assembly 50 will now be discussed. In general, the tracking assembly 50 includes an optical-based arrangement that detects displacement of the input device 40 and transmits a corresponding signal to the computing device 20, thereby causing the pointer image 35 to move relative to the image 32. This discussion is intended to provide an example of one configuration and manner of operation for an optical sensor system that is suitable for the tracking assembly 50. One skilled in the relevant art will recognize that a plurality of similar optical sensor systems may also be utilized within the scope of the present invention.

Figure 5:
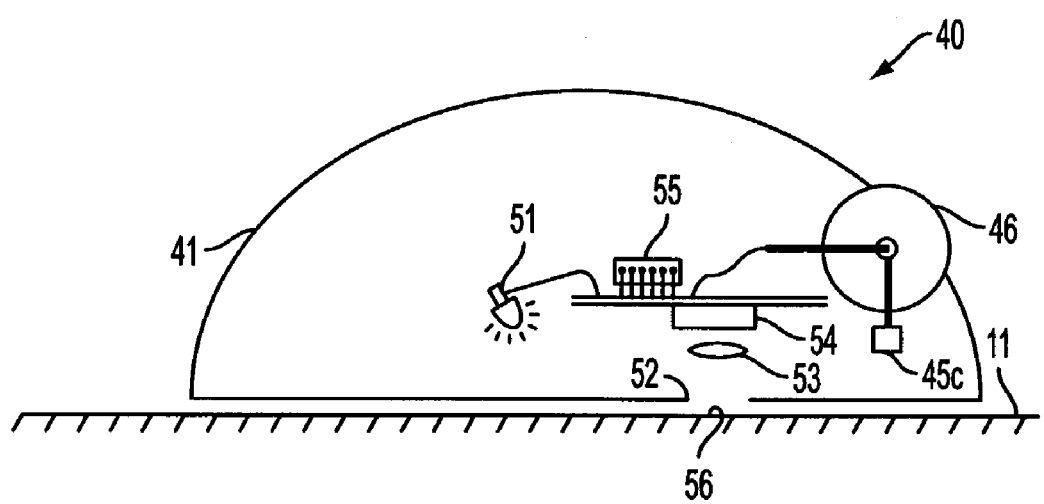
FIG. 5 is a schematic cross-sectional view of the input device that depicts the arrangement of a tracking assembly.

A schematic cross-sectional view of the input device 40 is depicted in FIG. 5 to illustrate the general configuration of the tracking assembly 50. In general, the tracking assembly 50 has the configuration of an optical sensor system that is disclosed in U.S. Pat. No. 6,172,354 to Adan et al, which includes a light emitter 51, an aperture 52, a lens 53, a light detector 54, and a microprocessor 55. One skilled in the relevant art will recognize, however, that other suitable optical sensing systems may be utilized within the scope of the invention. In general, electromagnetic radiation in the form of light is emitted from the light emitter 51 and passes through the aperture 52, thereby exiting the input device 40. A portion of the light reflects off of a target area 56 of the support surface 11 that is generally defined by the position of aperture 52 relative to the support surface 11. More precisely, a portion of the light is scattered off the target area 56. The reflected or scattered light then passes through the aperture 52 again, thereby reentering the input device 40. Thereafter, the reflected light is focused by the lens 53 and is detected by the light detector 54. Depending upon the specific characteristics of the support surface 11, the microprocessor may induce an increase or a decrease the intensity of the light output from the light emitter 51. The lens 53 is depicted as being separate from the light detector 54, but may be incorporated into the light detector 54 to reduce the number of components in the tracking assembly 50. Furthermore, another lens may be associated with light emitter 51 to direct the light toward the aperture 52.

The light emitter 51 may be any suitable source of electromagnetic radiation, such as a light emitting diode. The light detector 54 may be a two-dimensional photo-detector array. For example, the photo-detector array may be based upon Si CMOS technology, or the photo-detector array may be variable sensitivity photo detectors (VSPDs) that are formed as pair of diodes integrated onto and separated by a semi-insulated GaAs layer. The array of VSPDs may be a 32×32 element array, for example, but may have greater or lesser dimensions as desired.

The light detector 54 operates to generate an image signal indicative of an image or pattern on the target area 56 of the support surface 11. The image signal is transmitted to the microprocessor 55, which computes position information based on the image signal. That is, the image signal is utilized by the microprocessor 55 to determine whether the input device 40 has experienced translational displacement or angular displacement relative to the support surface 11. A corresponding signal is then transferred to the computing device 20 and an input device driver, for example, is utilized to interpret the corresponding signal and induce a movement of the pointer image 35.

The determination of whether the tracking assembly 50 detects translational displacement or angular displacement is governed by the state of the z-switch 45c, which is associated with depressing the scroll wheel 46. In general, the tracking assembly 50 detects and transmits a signal corresponding with angular displacement when the scroll wheel 46 is depressed and the z-switch 45c is activated. When the scroll wheel 46 is not depressed and the z-switch 45c is not activated, however, the tracking assembly 50 detects and transmits a signal corresponding with translational displacement. Accordingly, a signal corresponding with translational displacement is transmitted to the computing device 20 unless the user affirmatively depresses the scroll wheel 46.

Based upon the above discussion, the input device 40 operates in two modes. In the first mode, wherein the scroll wheel 46 is not depressed, the tracking assembly 50 detects only translational displacement and transmits a corresponding signal to the computing device 20. In the second mode, wherein the scroll wheel 46 is depressed, the tracking assembly 50 detects only angular displacement and transmits a corresponding signal to the computing device 20. Accordingly, the scroll wheel 46 operates as an actuator that toggles the operation of the tracking assembly 50 from translational displacement detection to angular displacement detection. In further embodiments of the present invention, a different switching element may be utilized, such as a separate depressible button, a rocker switch, or a sliding element, for example.

Alternately, the tracking system 50 may be configured to simultaneously detect translational movement and rotational movement and transmit corresponding data to the computing device 20. Similarly, the state of the scroll wheel 46 may be transmitted to the computing device 20. In this configuration, the computing device 20 may process the raw image data from the input device 40 into translational displacement data and/or rotational displacement data based upon the state of the scroll wheel 46. That is, image data may be captured by the tracking assembly 50 and processed by computing device 20, and movement of the pointer image 35 is controlled based upon the translational movement or the rotational movement of the input device 40 according to manipulation of the scroll wheel 46 by the user.

The manner in which the user operates the input device 40 to move the pointer image 35 will now be discussed. For purposes of reference, a y-axis 12 and an x-axis 13 are depicted on the support surface 11 in FIG. 1. When operating the input device 40, the hand of the user will generally rest upon an upper surface of the housing 41 such that the fingers extend over the keys 43a and 43b and over the scroll wheel 46. The fingers may then be utilized to selectively depress the keys 43a and 43b, rotate the scroll wheel 46, or depress the scroll wheel 46.

When the user is reviewing data in a relatively small portion of the image 32, the user may prefer that the pointer image 35 move in a continuous manner from one position to another position. In order to achieve the continuous movement of the pointer image 35, the user may move the input device 40 from a first location to separate second location on the support surface 11. The specific manner in which the pointer image 35 moves on the display screen 31 depends upon the relative positions of the first location and the second location. For example, if the user moves the input device 40 along the y-axis 12 without depressing the scroll wheel 46, then the tracking assembly 50 will detect the translational displacement of the input device 40 and transmit a corresponding signal to the computing device 20. The computing device 20 will then direct the pointer image 35 to move along the y-axis 33 on the display screen 31. Similarly, if the user moves the input device 40 along the x-axis 13 or a diagonal direction between the y-axis 12 and the x-axis 13 without depressing the scroll wheel 46, then the pointer image 35 will move along the x-axis 34 or in a diagonal direction on the display screen 31, respectively. Accordingly, the input device 40 may be utilized with the tracking assembly 50 in the first mode such that translational displacements of the input device 40 correspond with continuous movements of the pointer image 35.

In some circumstances, the attention of the user may shift from a first area of the display screen 31 to a different second area of the display screen 31. In order to move the pointer image 35 from the first area to the second area, the user may utilize the input device 40 in the first mode by repetitively moving the input device 40 relative to the support surface 11. This process, however, may be time-consuming and inefficient, particularly when the display screen 31 has relatively large dimensions and the first and second areas are separated by a relatively large distance. This is also the case when the settings of the input device driver are set to control fine or micro movements. Accordingly, the user may prefer that the pointer image 35 move in an accelerated manner from the first position to the second position. In order to achieve this result, the user may depress the scroll wheel 46 to activate the z-switch 45c, and then the user may rotate the input device 50. The tracking assembly 50, which operates in the second mode when the scroll wheel 46 is depressed, will then detect the angular displacement of the input device 40 and transmit a corresponding signal to the computing device 20. The computing device 20 will then direct that the pointer image 35 move in an instantaneous manner along the x-axis 34, for example, on the display screen 31.

The specific direction of movement for the pointer image 35 when the input device 40 is operated in the second mode may vary within the scope of the present invention. In one embodiment, a clockwise rotation of the input device 40 may induce a corresponding movement of the pointer image 35 that is in the direction of the positive portion of the x-axis 34. Similarly, a counter-clockwise rotation of the input device 40 may induce a corresponding movement of the pointer image 35 that is in the direction of the negative portion of the x-axis 34. In another embodiment, clockwise and counter-clockwise rotations of the input device 40 may induce the pointer image 35 to move along the y-axis 33.

In accordance with the above discussion, the user may utilize the input device 40 in a first mode or a second mode. In the first mode, the pointer image 35 continuously moves relative to the display screen 31 based upon the translational displacement of the input device 40. Accordingly, the user may utilize the first mode to induce precise, relatively small movements in the pointer image 35, and for movements along the y-axis 33, the x-axis 34, or a diagonal direction therebetween. In the second mode, the pointer image 35 instantaneously moves in an accelerated manner along the x-axis 34 relative to the display screen 31 and based upon the angular displacement of the input device 40. Accordingly, the user may utilize the second mode to induce less-precise, relatively large movements in the pointer image 35. When utilized with a relatively large display screen 31, the efficiency of the user may be increased by properly utilizing the first mode and the second mode.

The distance traversed by the pointer image 35 may be dependent upon the amount by which the input device 40 is angularly rotated, and the distance traversed by the pointer image 35 may be controlled to suit the preferences of the user. Some users, for example, may prefer that an angular rotation of 30 degrees, for example, induce a relatively small movement in the pointer image 35, perhaps 10 percent of the width of the display screen 31. Other users may prefer that a lesser angular displacement of 10 degrees, for example, induce a relatively large movement in the pointer image 35, perhaps 50 percent of the width of the display screen 31. Accordingly, a relatively small degree of angular displacement may be correlated with a greater movement distance of the pointer image 35. The amount of movement in the pointer image 35 may be pre-set in the software that is utilized in connection with the input device 40. Alternately, the user may be permitted to vary the amount of movement in the pointer image 35 by changing various settings associated with the driver software for the input device 40. Accordingly, the user may be given ultimate control over the distance traversed by the pointer image 35 in response to an angular displacement of the input device 40.

Figure 6:
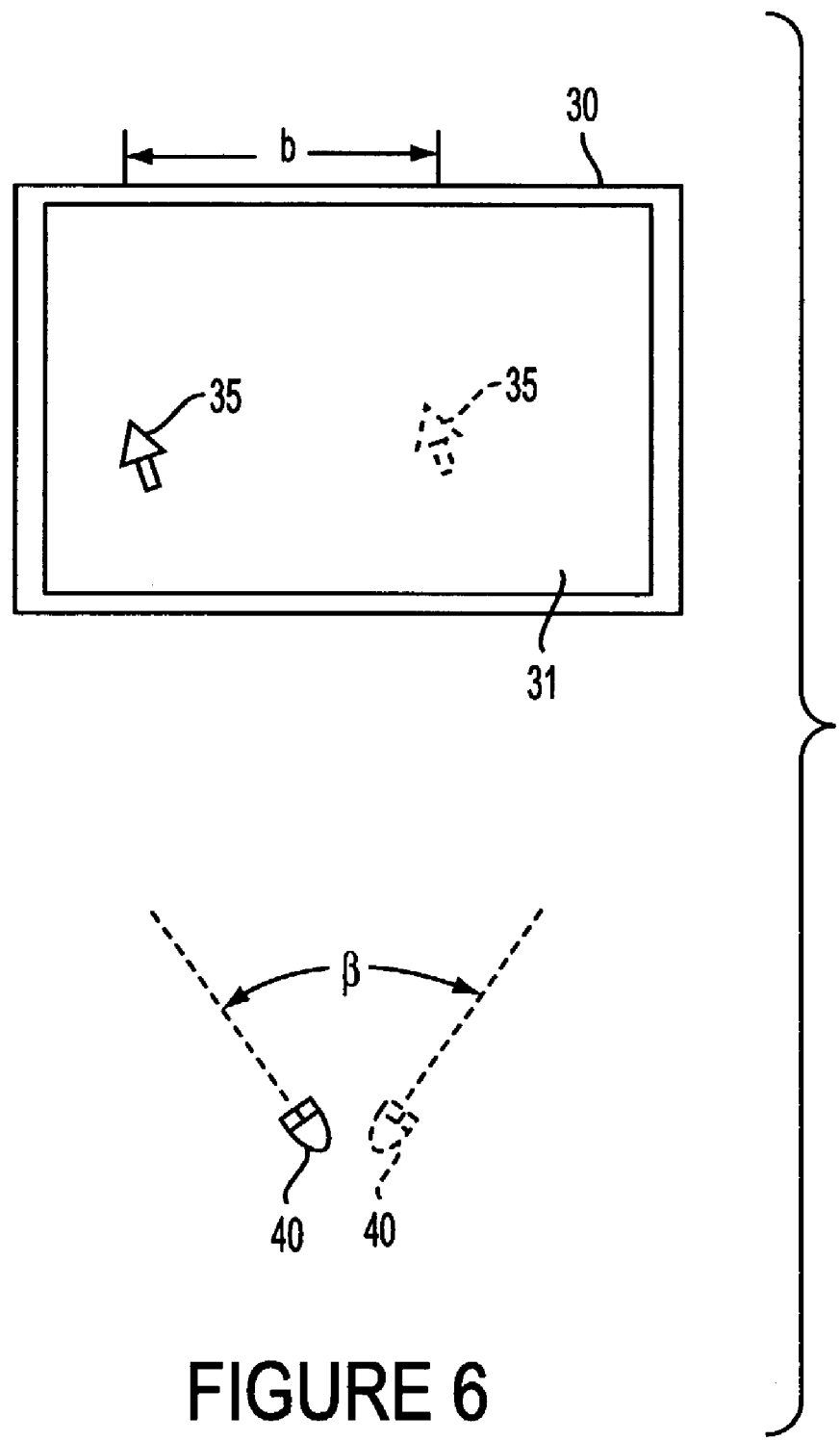
FIG. 6 is a schematic view depicting an absolute reference for movement of an image rendered on the output device.

The correlation between the angular displacement of the input device 40 and the amount of movement in the pointer image 35 may be referenced absolutely or proportionally, for example. With reference to FIG. 6, the absolute reference concept is discussed. In general, an absolute reference correlates a specific degree of angular displacement (represented by angle $\beta$) in the input device 40 with a specific amount of movement (represented by distance b) of the pointer image 35 that is independent of the dimensions of the display screen 31. Accordingly, rotating the input device through an angular displacement of angle $\beta$ corresponds absolutely with a movement of the pointer image 35 of distance b regardless of the ultimate width of the display screen 31. For purposes of example, the user may configure the input device 40 or software associated with the input device 40 such that a 40 degree rotation of the input device 40 corresponds with a 40 pixel movement of the pointer image 35. The input device driver limits movement of the pointer image 35 such that the pointer image does not continue beyond the lateral ends of the display screen 31.

Figure 7:
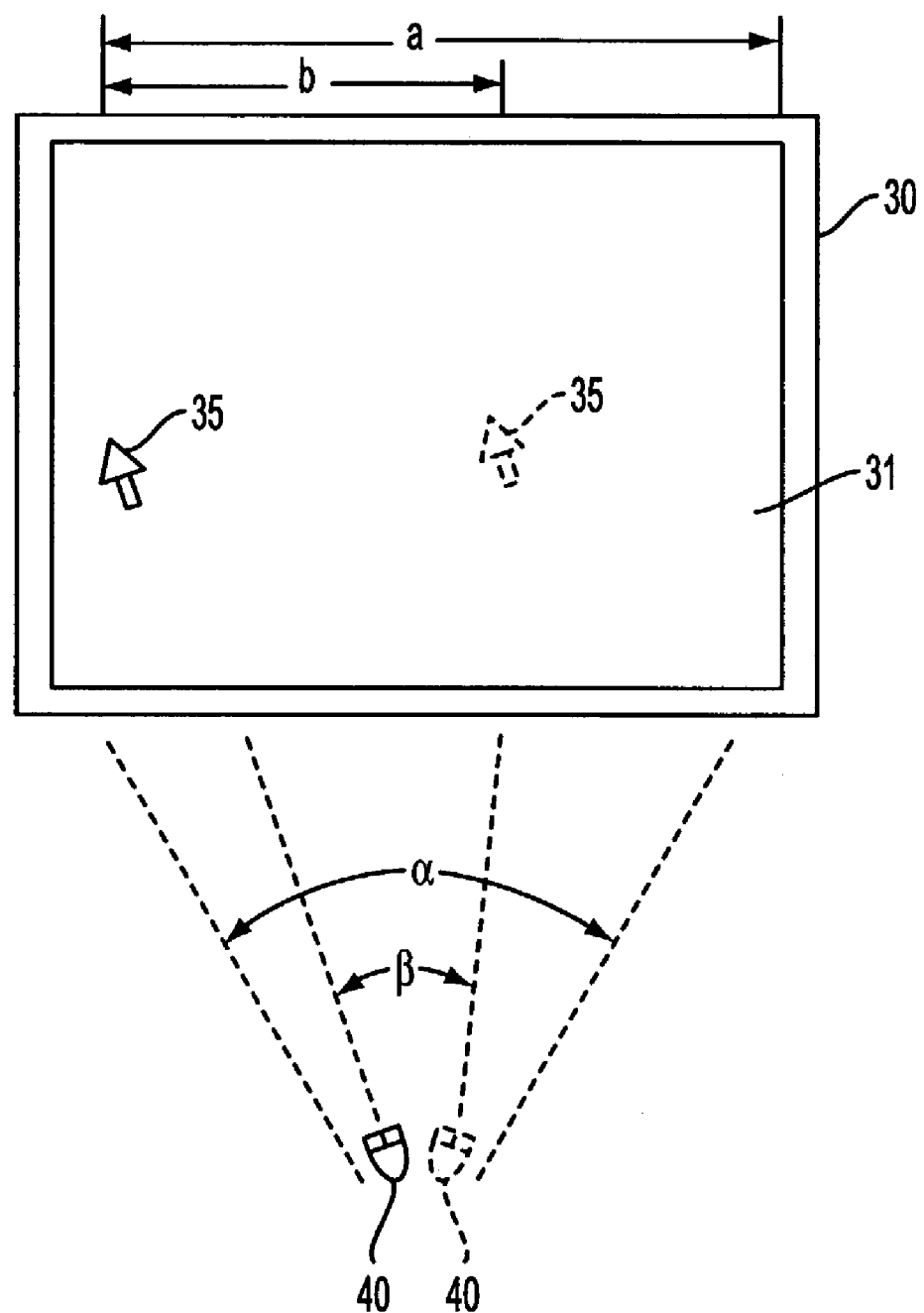
FIG. 7 is a schematic view depicting a proportional reference for movement of the image rendered on the output device.

With reference to FIG. 7, the proportional reference concept is discussed. In general, a proportional reference utilizes a relationship between (i) the distance between the pointer image 35 and an end of the display screen 31 (represented by distance a); (ii) the amount of movement of the pointer image 35 (represented by distance b); (iii) an effective angular degree of travel that may be set or modified to be the apparent angle the input device 40 would rotate to point toward an end of the display screen 31 (represented by angle $\alpha$); and (iv) the actual angular displacement of the input device 40 (represented by angle $\beta$). Accordingly, the movement of the pointer image 31 may be governed by the following equation: $\beta/\alpha=b/a$. In operation, therefore, the amount of movement of the pointer image 35 is related to the available distance of travel from the pointer image 35 to the end of the display screen 31. The pointer image 35 is moved, therefore, the distance b on display screen 31 according to the following equation: $b=\beta a/\alpha$. Thus, if a preset angular distance travel for the input device 40 is set to 80 degrees, and the user angularly displaces the input device 40 by an angle of 40 degrees while depressing scroll wheel 46, the pointer image 35 will be directed to move 50% of the distance from its present position (shown in solid line) to the lateral end of the display screen 31 to arrive at a later position (shown in dashed line). The pointer image 35 may be set to move in an accelerated mode to quickly advance to the second position. Alternately, the pointer image 35 can be set to immediately traverse from the present position to the later position.

Figure 8:
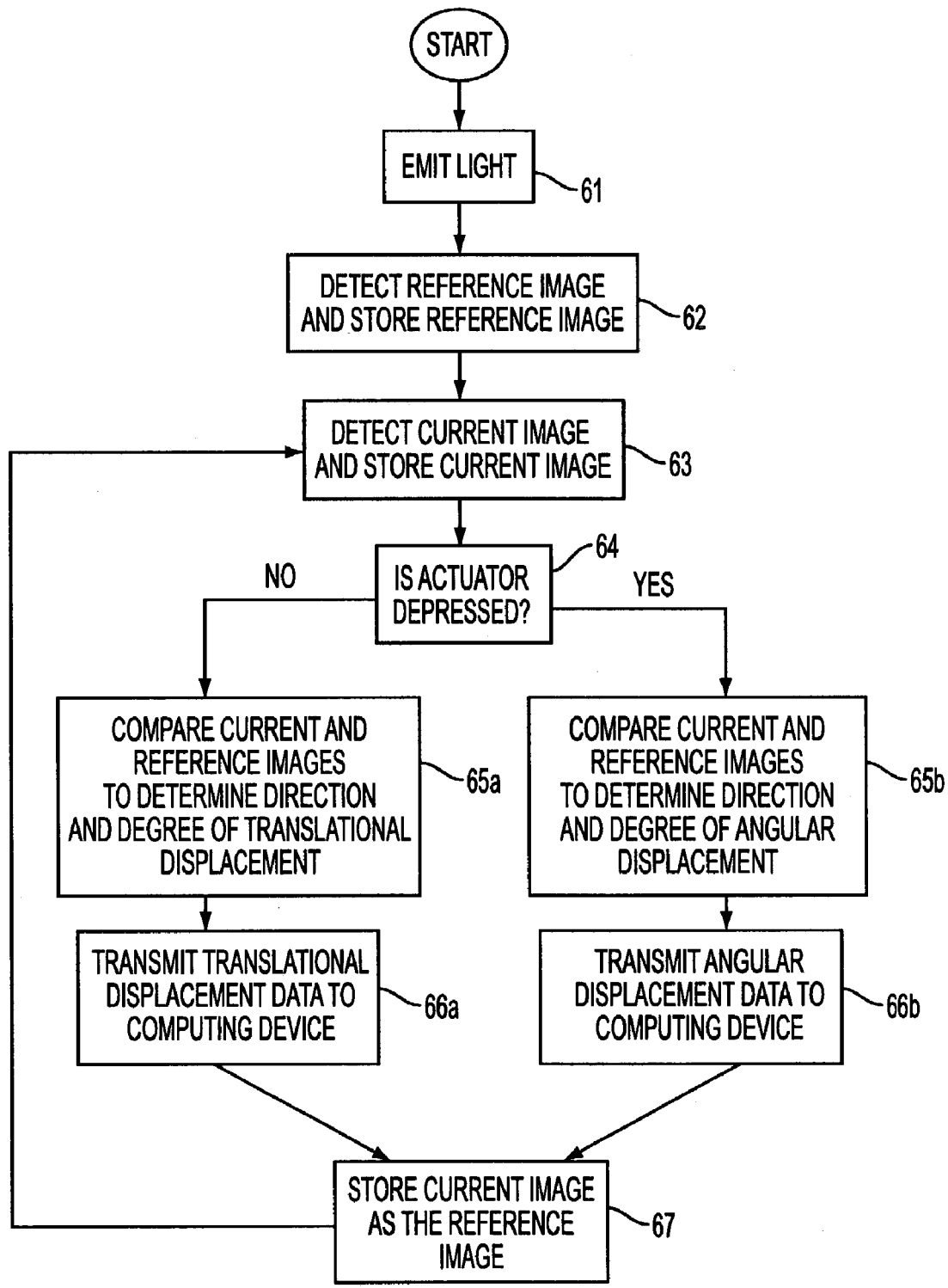
FIG. 8 is a flow-diagram that illustrates the operation of the tracking assembly.

A flow-diagram that illustrates the operation of the tracking assembly 50 according to an exemplary embodiment is depicted in FIG. 8. The microprocessor 55 generally operates to direct the operation of the various components of the tracking assembly 50, and the microprocessor 55 transmits signals to the computing device 20 that are indicative of the movement of the input device 40. Initially, the microprocessor 55 directs the light emitter 51 to emit light (step 61). The light then exits the aperture 52, reflects off of the target area 56 of the support surface 11, and reenters the housing 41. The microprocessor 55 then directs the light detector 54 to detect the reflected or scattered light, thereby forming an image representative of the features of the support surface 11 that is stored as a reference image (step 62). After a predetermined time period, the light detector 54 detects the reflected light again to form another image representative of the features of the support surface 11 that is stored as a current image (step 64). The microprocessor 55 then determines whether the actuator that toggles between the first mode and the second mode is depressed while the light is emitted and detected (step 64). If the actuator is not depressed, then the microprocessor 55 compares the current image with reference image to determine the direction and degree of translational displacement that has occurred (step 65a). Based upon the comparison, the microprocessor 55 transmits a signal to the computing device 20 that relays translational displacement data concerning the direction and degree of translational displacement of the input device 40 (step 66a). The current image is then set to be the reference image and is stored (step 67). The process discussed above then repeats indefinitely beginning with step 63. Accordingly, a first image is taken; a second image is taken and compared with the first image; the process repeats such that a third image is taken and compared with the second image; and the process repeats again such that a fourth image is taken and compared with the third image.

When the user intends for the input device 40 to be utilized in the second mode, the microprocessor 55 will detect the depression of the actuator (step 64). The microprocessor 55 then compares the current image with the reference image to determine the degree of angular displacement that has occurred (step 65b). Based upon the comparison, the microprocessor 55 transmits a signal to the computing device 20 that relays angular displacement data concerning the degree of angular displacement of the input device 40 (step 66b). The process discussed above then repeats indefinitely beginning with step 63. Accordingly, a first image is taken; a second image is taken and compared with the first image; the process repeats such that a third image is taken and compared with the second image; and the process repeats again such that a fourth image is taken and compared with the third image.

Figure 9A:
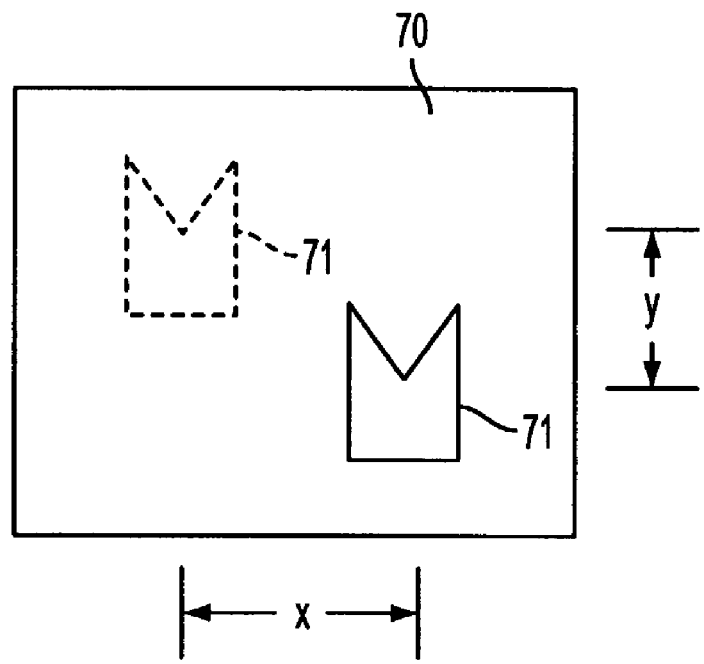
FIG. 9A is a schematic illustration of a comparison image for determining translational displacement of the input device.

As discussed above, the microprocessor 55 compares images of the target area 56 of the support surface 11 to determine the direction and degree of translational displacement or the direction and degree of angular displacement. Referring to FIG. 9A, a comparison image 70 of the support surface 11 is depicted. The comparison image 70 includes an object 71 that may be a texture, impression, figure, or other visual queue that is on the support surface 11. The dashed representation of the object 71 represents a first position of the object 71, and the solid representation of the object 71 represents a second position of the object 71. The microprocessor 55 compares the movement of the object 71 by measuring x-displacement and the y-displacement between the first position and the second position. In this manner, the microprocessor 55 may determine the direction and degree of translational displacement and transmit a corresponding signal to the computing device 20.

Figure 9B:
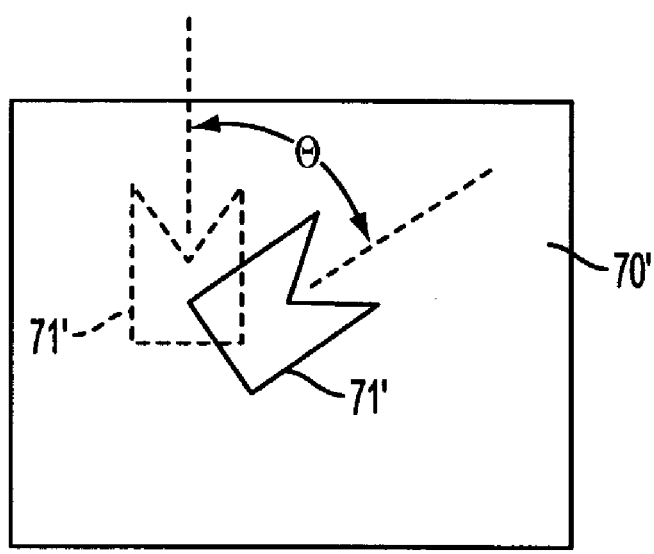
FIG. 9B is a schematic illustration of a comparison image for determining angular displacement of the input device.

Referring to FIG. 9B, another comparison image 70' of the support surface 11 is depicted. The comparison image 70' includes an object 71' that may also be a texture, impression, figure, or other visual queue that is on the support surface 11. The dashed representation of the object 71' represents a first position of the object 71', and the solid representation of the object 71' represents a second position of the object 71'. The microprocessor 55 compares the movement of the object 71' by measuring an angular displacement θ between the first position and the second position. In this manner, the microprocessor 55 may determine the direction and degree of angular displacement and transmit a corresponding signal to the computing device 20. Such translational and angular displacement comparisons may be performed by comparing a small region of the reference image to the entire current image to determine the translational or angular displacement of the small region, for example.

Under many circumstances, the actual movement of the input device 40 will include both translational displacement and rotational displacement. The microprocessor 55 or the input device driver will then be required to determine the degree of rotational displacement independent of the degree of translational displacement. A conventional optical tracking system utilizes a single sub-array within the two-dimensional photo-detector array, and the conventional optical tracking system will utilize the single sub-array to determine the degree of translational displacement. Although a single portion of the array may be utilized to determine rotational displacement, three sub-arrays arranged in a generally triangular pattern within the two-dimensional photo-detector array may also be utilized. The relative rotational displacement and the direction of rotational displacement may then be calculated from the movements of any of the sides of the generally triangular pattern, with the resulting rotational displacement being independent of the effects of translational displacement.

The discussion above generally describes one embodiment of the present invention. One skilled in the relevant art will recognize, however, that a plurality of variations upon the general concepts outlined above may be introduced without departing from the spirit of the invention. As discussed above, the input device 40 may be utilized to move the pointer image 35 (e.g., an image of a cursor or other image) relative to the display screen 31. The input device 40 may also be utilized, for example, to move the viewable contents of a data file relative to the display screen 31. The viewable contents of a data file, rendered on the display screen 31, may possess a size exceeding the viewable boundaries of the display screen 31. To address this issue, a user may utilize a virtual scroll ball or scroll wheel to reposition the viewable contents of the data file relative to the display screen 31, thereby permitting the user to view portions of the data file not currently rendered. As utilized herein, scrolling describes a translatory movement of the image 32 relative to the display screen 31 and in a particular direction. For example, scrolling down generally describes a movement of the viewable contents of the data file relative to the display screen 31 so as to produce an effect of moving downward in the viewable contents of the data file. Similarly, scrolling up, scrolling left, and scrolling right generally describe movement of the viewable contents of the data file relative to the display screen 31 so as to produce an effect of moving the viewable contents of the data file upward, left, and right, respectively.

A significant portion of some data files may not be currently rendered on the display screen 31. For example, a text document having multiple pages may be displayed such that only a portion of one page is actually visible. In order to view other portions of the text document, the user may rotate the scroll wheel 46. Depending upon the size of the text document, however, a relatively significant amount of movement may be required to scroll to the desired location. In accordance with the present invention, the user may depress the scroll wheel 46 and rotate the input device 40 to induce the image to scroll in an accelerated manner. Accordingly, the driver software associated with the input device 40 may be configured to cause the image 32 to scroll when a signal is received that indicates angular displacement of the input device 40 relative to the support surface 11.

The direction that the image scrolls in response to angular displacement of the input device 40 may be dependent upon the direction that the input device 40 is angularly displaced. For example, a clockwise angular displacement of the input device 40 may cause the image to scroll upward, or along the positive portion of the y-axis 33, and a counter-clockwise rotation of the input device 40 may cause the image to scroll downward, or along the negative portion of the y-axis 33. Similarly, rotation of the input device 40 may cause scrolling along the x-axis 34 or any diagonal direction between the x-axis 34 and the y-axis 33.

A plurality of variations may be employed in connection with the input device 40. For example, the optical sensing system of tracking assembly 50 may be replaced with a gyroscopic, magnetic, capacitive, or potentiometer-based tracking system. As disclosed above, angular displacement of the input device 40 induces an instantaneous movement of the pointer image 35 or an instantaneous scrolling of the image 32. In further embodiments, angular displacement of the input device 40 may include panning of the pointer image 35 or the image 32. As utilized herein, panning is the automatic and/or continuous scrolling of an image, often in response to a single command or input. Although panning does not have the velocity of instantaneous movement or instantaneous scrolling, panning has the benefit of not requiring multiple, separate displacements of the input device 40 to cause the pointer image 35 or the image 32 to move a desired distance.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An input device intended to be moved relative to a supporting surface, the input device comprising:
    a housing that forms at least a portion of an exterior of the input device, the housing having a support portion for supporting the input device on the supporting surface;
    a sensor system located at least partially within the housing, the sensor system being operable in a translational mode to detect translational displacement of the input device relative to the support surface and while the input device is in contact with the supporting surface, and the sensor system being operable in an angular mode to detect angular displacement of the input device relative to the support surface and while the input device is in contact with the supporting surface, the sensor system comparing a first image of the supporting surface with a second image of the supporting surface to determine (a) a translational displacement between the first image and the second image when in the translational mode and (b) an angular displacement between the first image and the second image when in the angular mode; and
    an actuator that selectively converts operation of the sensor system between the translational mode and the angular mode.

2. The input device recited in claim 1, wherein the sensor system is an optical sensor system having a light emitter and a light detector.

3. The input device recited in claim 1, wherein the input device is a computer mouse.

4. The input device recited in claim 1, further including a processor located at least partially within the housing and operatively connected to the sensor system.

5. The input device recited in claim 4, wherein the processor is configured to transmit a first signal corresponding with translational movement of an image in response to the translational displacement of the input device relative to the support surface, and the processor is configured to transmit a second signal also corresponding with linear movement of the image in response to the angular displacement of the input device relative to the support surface.

6. The input device recited in claim 1, wherein the actuator is a depressible switch protruding from the housing.

7. The input device recited in claim 6, further comprising a primary key and a secondary key located on the housing, the actuator being positioned between the primary key and the secondary key.

8. The input device recited in claim 1, wherein the actuator is a rotatable wheel.

9. An input device intended to be moved relative to a supporting surface, the input device comprising:
    a housing that forms at least a portion of an exterior of the input device, the housing having a support portion for supporting the input device on the supporting surface, and the housing defining an aperture in the exterior of the input device and adjacent the supporting surface;
    an optical sensor system located at least partially within the housing to detect both translational displacement and angular displacement of the input device relative to the support surface by comparing images of the support surface obtained through only the aperture; and
    a controller located at least partially within the housing and operatively connected to the optical sensor system, wherein the controller is configured to transmit a first signal relating to translational movement of an image on a display screen in response to the translational displacement of the input device relative to the support surface, and the controller is configured to transmit a second signal also relating to translational movement of to image on the display screen in response to the angular displacement of the input device relative to support surface.

10. The input device recited in claim 9, wherein the optical sensor system includes a light emitter and a light detector.

11. The input device recited in claim 9, wherein the optical sensor system is operable in a translational mode to detect translational displacement of the input device with respect to the support surface, and the optical sensor system is operable in an angular mode to detect angular displacement of the input device with respect to the support surface.

12. The input device recited in claim 11, further including an actuator that selectively converts operation of the sensor system between the translational mode and the angular mode.

13. The input device recited in claim 12, wherein the actuator is a depressible switch protruding from the housing.

14. The input device recited in claim 12, further comprising a primary key and a secondary key located on the housing, the actuator being positioned between the primary key and the secondary key.

15. The input device recited in claim 12, wherein the actuator is a rotatable wheel.

16. The input device recited in claim 9, wherein the input device is a computer mouse.

17. A method of moving an image relative to a display screen, the method comprising steps of:
    detecting translational displacement of an input device relative to a support surface on which the input device rests by comparing a first image of the supporting surface with a second image of the supporting surface to determine a translational displacement between the first image and the second image;
    transmitting a first signal to a computing device based on the detected translational displacement;
    detecting angular displacement of the input device relative to the support surface on which the input device rests by comparing a third image of the supporting surface with a fourth image of the supporting surface to determine an angular displacement between the third image and the fourth image; and
    transmitting a second signal to the computing device based on the detected angular displacement.

18. The method recited in claim 17, wherein the step of detecting translational displacement includes optically detecting the translational displacement, and the step of detecting angular displacement includes optically detecting the angular displacement.

19. The method recited in claim 17, wherein the step of transmitting the first signal includes utilizing a processor to process the detected translational displacement and transmit the first signal, and the step of transmitting the second signal includes utilizing a processor to process the detected angular displacement and transmit the second signal.

20. The method recited in claim 17, wherein the step of transmitting the first signal directs the computing device to continuously translate the image on the display screen.

21. The method recited in claim 17, wherein the step of transmitting the second signal directs the computing device to translate the image on the display screen in an accelerated manner.

22. The method recited in claim 17, wherein the steps of transmitting the first signal and transmitting the second signal direct the computing device to horizontally translate the image on the display screen.

23. A method of moving an image relative to a display screen, the method comprising steps of:
  obtaining a first picture of a support surface with an optical sensor system;
  obtaining a second picture of the support surface with the optical sensor system;
  comparing the second picture to the first picture to detect angular displacement of the second picture with respect to the first picture; and
  directing translation of the image in response to the angular displacement of the second picture with respect to the first picture.

24. The method recited in claim 23, wherein the steps of obtaining the first picture and obtaining the second picture include optically detecting the support surface with a light emitter and a light detector of the optical sensor system.

25. The method recited in claim 23, further including a step of utilizing a processor to transmit a signal.

26. The method recited in claim 23, wherein to step of directing translation includes directing a computing device to translate the image on the display screen in an accelerated manner.

27. The method recited in claim 23, wherein the step of directing translation includes directing a computing device to horizontally translate the image on the display screen.

28. The method recited in claim 23, wherein the step of directing translation includes translating the image by an amount that is directly-correlated to a degree of angular displacement.

29. The method recited in claim 23, wherein the step of directing translation includes translating the image by an amount that is proportional to a distance from the image to an edge of a display.

* * * * *